(12) United States Patent
Hirota et al.

(10) Patent No.: US 6,206,359 B1
(45) Date of Patent: Mar. 27, 2001

(54) AUTO DOCUMENT FEEDER

(75) Inventors: Kazuhiro Hirota, Hachioji; Eiichi Kubo, Yamanashi-ken, both of (JP)

(73) Assignees: Konica Corporation, Tokyo; Nisca Corporation, Yamanashi-ken, both of (JP)

( * ) Notice: Subject to any disclaimer, the term of this patent is extended or adjusted under 35 U.S.C. 154(b) by 0 days.

(21) Appl. No.: 09/192,026

(22) Filed: Nov. 13, 1998

(30) Foreign Application Priority Data

Nov. 17, 1997 (JP) .................................................... 9-315364

(51) Int. Cl.[7] ............................... B65H 83/00; B65H 5/34
(52) U.S. Cl. ......................... 271/3.15; 271/4.1; 271/270; 399/365; 399/371
(58) Field of Search .................................. 271/3.14, 3.15, 271/3.16, 4.02, 4.03, 4.1, 10.02, 10.03, 270; 399/370, 271, 365

(56) References Cited

U.S. PATENT DOCUMENTS

| 4,451,027 | * | 5/1984 | Alper ................................... 271/270 |
| 5,129,641 | * | 7/1992 | Long .................................. 271/10.03 |
| 5,339,139 | * | 8/1994 | Fullerton et al. ..................... 399/367 |
| 5,423,527 | * | 6/1995 | Tranquilla ............................ 271/270 |
| 5,597,153 | * | 1/1997 | Maruyama et al. .................. 271/4.1 |
| 5,819,152 | * | 10/1998 | Kobayashi et al. ................... 399/367 |
| 5,826,155 | * | 10/1998 | Kobayashi et al. ................... 399/317 |
| 5,887,865 | * | 3/1999 | Ishimaru .............................. 271/3.1 |
| 5,946,527 | * | 8/1999 | Salgado et al. ..................... 271/3.01 |

FOREIGN PATENT DOCUMENTS

| 61-178363 | 8/1986 | (JP) . |
| 5-055157 | 3/1993 | (JP) . |
| 5-55157 | 7/1993 | (JP) . |

* cited by examiner

*Primary Examiner*—H. Grant Skaggs
(74) *Attorney, Agent, or Firm*—Frishauf, Holtz, Goodman, Langer & Chick, P.C.

(57) ABSTRACT

An automatic document feeder includes a feed tray 2 on which documents are placed, a feeder 4 for feeding documents on the feed tray 2 to a conveyor path, conveying 8 for conveying the fed documents to an image reading position, a discharging 9 for discharging the read documents onto a discharging tray 37, and a controller by which the discharging speed of the documents after being read so that the discharging speed varies with respect to the conveying speed, wherein, if the conveying speed when reading a document is within a predetermined range, the discharging speed after reading the document is controlled to be equal to the conveying speed when reading the document, and if the conveying speed when reading the document is out of the predetermined range, the discharging speed after reading the document is controlled to be within the predetermined range.

10 Claims, 8 Drawing Sheets

AUTO DOCUMENT FEEDER

BACKGROUND OF THE INVENTION

1. Field of the Invention

The present invention relates to an automatic document feeder for use in image readers such as copying machines, facsimile machines, etc.

2. Description of the Related Art

Conventionally, automatic document feeders installed on a copying machine body are generally provided with such mechanism that documents placed on a feed tray are fed one by one automatically to a reading means installed in the copying machine body, and are then read by an optical system provided in the copying machine and discharged onto a discharging tray. In order to realize high-speed conveyance of documents, there have been proposed some arrangements in that, for example, documents are conveyed at a high-speed after they are read, and then discharged onto a discharging tray (Japanese Laid-open Utility Model No. 55157 of 1993), or documents are conveyed at high speed after they are read, and then slowed down just before discharging so as to be discharged gently onto a discharging tray (Japanese Laid-open Patent No. 178363 of 1986).

If documents are conveyed at high speed and discharged after they are read in such a conventional automatic document feeder, however, the documents often fly out onto the discharging tray so as to be scattered. This arises a problem of poor alignment of the documents. In addition, if the document feeding is slowed down just before discharging, another problem arises wherein the high conveying speed is sacrificed, although the above-mentioned poor alignment problem is solved. In the cases described above, therefore, the following document cannot be conveyed before the preceding document is discharged since there is a difference between reading and discharging speeds of documents. Consequently, such conventional arrangements include possibilities whereby the total processing speed of the automatic document feeder may be lowered.

Under such the circumstances, the object of the present invention is to provide an automatic document feeder that can solve the problem of poor alignment of discharged documents on a discharging tray, as well as improve the total processing speed of the document feeder.

SUMMARY OF THE INVENTION

In order to solve the above problems, the automatic document feeder according to the first aspect of the present invention comprises a feed tray on which documents are placed, a feed means for feeding documents placed on the feed tray into a conveying path, a conveying means for leading documents fed into the conveying path to an image reading position and then conveying the documents via the reading position, a discharging means for discharging the documents read at the above-mentioned image reading position onto a discharging tray, and a control means for controlling the conveying speeds when documents are read, and the discharging speed of documents after the documents are read in the conveying means and discharging means. The above-mentioned control means controls the feeding of documents so that, after the document which is already read is conveyed at the first discharging speed, the rear end of the document is discharged by switching the first discharging speed to the second discharging speed which is lower than the first discharging speed, and furthermore, if the conveying speed of the conveying means when reading the following document is within the predetermined range, the following document is conveyed to the reading position after completion of the preceding document discharging by the discharging means.

In order to solve the above problems, the automatic document feeder according to the second aspect of the present invention comprises a feed tray on which documents are placed, a feed means for feeding documents placed on the feed tray into a conveying path, a conveying means for leading documents fed into the conveying path to an image reading position and then conveying the documents via the reading position, a discharging means for discharging read documents onto a discharging tray, and a control means for controlling the conveying speeds when documents are read, and the document discharging speed after documents are read in the above-mentioned conveying means and the above-mentioned discharging means, wherein the above-mentioned control means controls the feeding of documents so that, after the document which is already read is conveyed at the first discharging speed, the rear end of the document is discharged by switching the first discharging speed to the second discharging speed which is lower than the first discharging speed, and furthermore, if the conveying speed of the conveying means when reading the following document is within the predetermined range, the preceding document is not discharged but stopped once at the downstream of the image reading position until a document fed from the feeding means reaches the conveying means, and when the following document reaches the prescribed position, the discharging operation to deliver the preceding document onto the discharging tray and the conveying operation to convey the following document to the image reading position are simultaneously carried out.

[Indication of Reference Numerals]

In the drawings, 1 designates an automatic document feeder, 2 is a feed tray, 4 is a document feed means, 8 is a document conveying means, 9 is a document discharging means, 22 is a conveying roller, 36 is a discharging roller and 37 is a discharging tray.

DETAILED DESCRIPTION OF THE PREFERRED EMBODIMENTS

Figure 1:
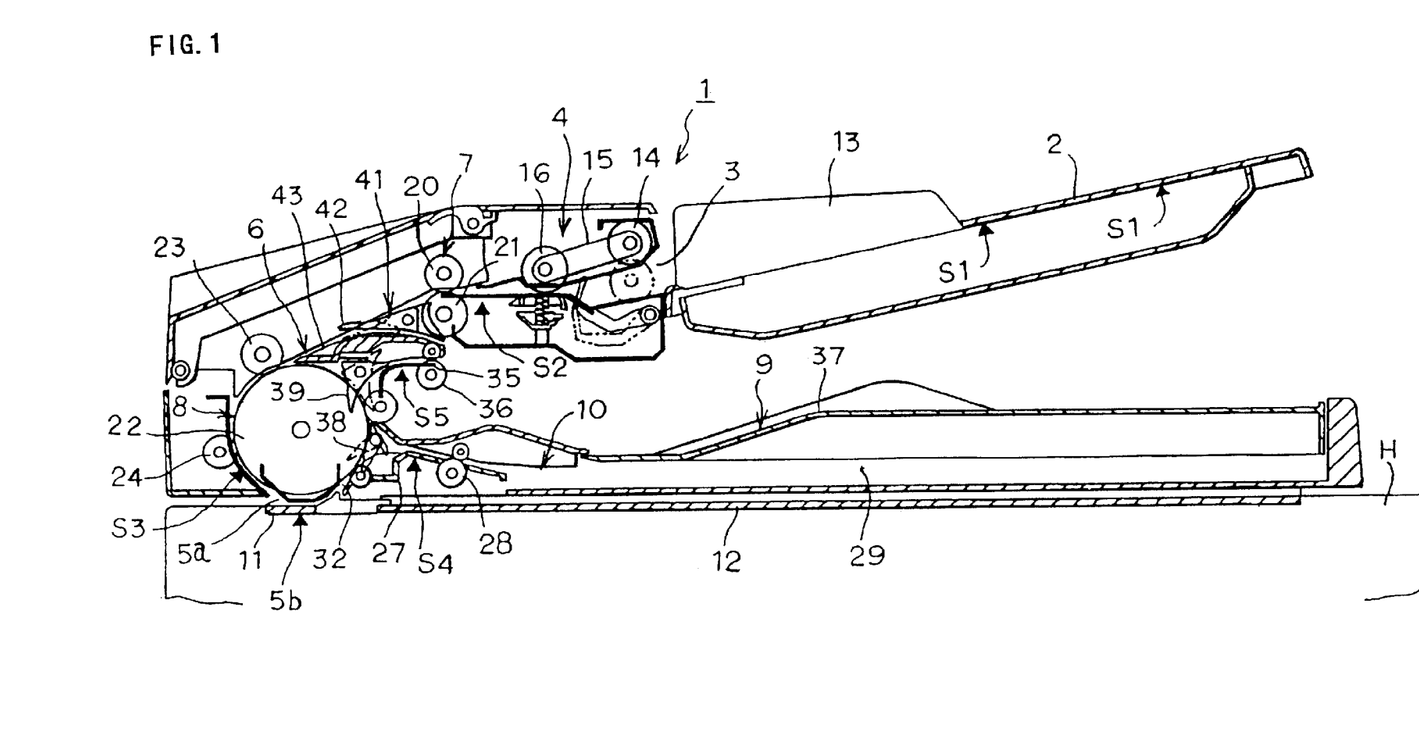
FIG. 1 is an entire schematic view of an automatic document feeder according to the present invention.
Figure 2:
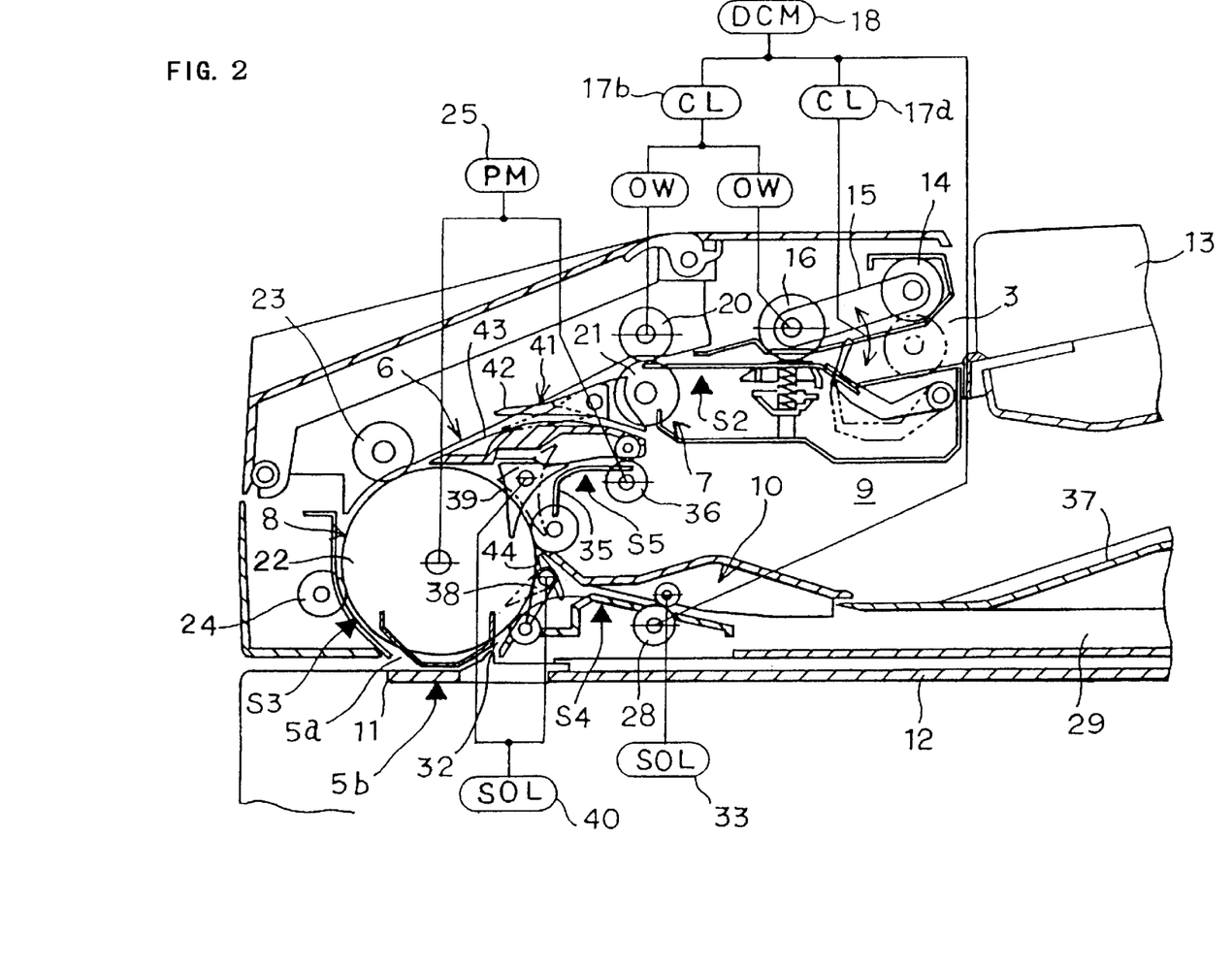
FIG. 2 is an enlarged view showing the major parts of the automatic document feeder of the present invention.

Hereafter, the embodiments of an automatic document feeder relating to the invention will be described in detail with reference to the accompanying drawings. FIGS. 1 and 2 are schematic views showing the configuration of the automatic document feeder according to the embodiment of the present invention.

The automatic document feeder 1 according to this embodiment comprises a feed tray 2 for placing documents thereon, a document feed means 4 provided in the vicinity of a feed port 3, a resist roller 7 for applying resist to the front end of each document fed by the document feed means 4, a document conveying means 8 for conveying documents applied with resist to an image reading position 5a, a document discharging means 9 for discharging documents read by the image reading means 5b at the copying machine H opposing to the image reading position 5a, and a document reversing means 10 provided on the way of a discharging path 32.

Documents placed on the feed tray 2 are conveyed sequentially to the image reading position 5a. Each of those documents, after the image on one side thereof is read, is discharged by the document discharging means 9, or turned over by the document reversing means 10 and conveyed back to the image reading position 5a again by the document conveying means 8, whereby the image on the other side of the document is read.

The copying machine H is provided with a transparent glass 11 for reading images at the image reading means 5b in a mode of automatic feeding of documents and a platen 12 for reading images by moving the image reading means 5b for scanning when a document from a book, etc., is placed thereon.

The feed tray 2 is disposed so as to be inclined toward the feed port 3 of the automatic document feeder, and is provided with a guide plate 13 movable in the direction of the document width. This guide plate 13 is intended to detect the width of each document, which is connected to a variable resistor via a rack and pinion gear. The width of each document is detected by the guide plate according to the resistance value when the document is moved in the width direction. The feed tray 2 is also provided with two size detecting sensors S1 in the feeding direction to detect the document length in the feeding direction. These size detecting sensors S1 are composed of, for example, a limit switch, an optical sensor, etc., and combined with the above-mentioned guide plate 13 to detect the size of documents.

The document feed means 4 is provided in the vicinity of the feed port 3, which is composed of a feed roller 14 used as a feed means movable in the thickness direction of the document set on the feed tray 2, an arm 15 for supporting the feed roller 14 rotatably, and a separation roller 16 positioned at the other end side of the arm 15. The feed roller 14 is usually arranged at a standby position. When the feed clutch 17a is actuated, the feed roller 14 is moved to the feeding position from the standby position and rotated in accordance with the rotation of the separation roller 16 to feed the document from the feed tray 2. The feed clutch 17b which is actuated together with the reverse rotation of a DC motor 18 rotates the separation roller 16. Documents are separated one by one between the separation roller 16 and a separation pad, then fed into the conveying path 6. Between the feed roller 14 and the separation roller 16 is provided an empty sensor (not illustrated), which detects existence of documents on the feed tray 2.

At the downstream side of the above-mentioned separation roller 16, a resist sensor S2 is disposed. Around the resist sensor S2, a resist roller 7 is disposed. The resist roller 7 is composed of a drive roller 20 and a coupled roller 21. The drive roller 20 is rotated at a predetermined timing according to the forward rotation of the DC motor 18.

Documents are aligned so that their front ends come in contact with the resist roller 7, while the drive roller 20 is rotated after it stands by for a fixed time. Accordingly, a document is sandwiched between the drive roller 20 and the coupled roller 21 and fed into the conveying path 6.

The document conveying means 8 is comprised of a conveying roller 22 for winding and conveying documents and pinch rollers 23 and 24 disposed on the circumferential surface of the conveying roller 22. Each document is gripped between the conveying roller 22 and the pinch rollers 23 and 24 and conveyed to the image reading position 5a.

A read sensor S3 is provided near the upstream side of the image reading position 5a. This read sensor S3 is a front end feed sensor for stopping the conveying of documents and making each stand by before the image reading. Each document which stands by just before the image reading position 5a is conveyed again in response to a read starting signal received from the copying machine H. The image of the document thereon is thus read by the image reading means 5b when the document passes the surface of the transparent glass 11.

The document discharging means 9 is comprised of a discharging tray 37 disposed under the above-mentioned feed tray 2, a pair of upper and lower guides 35 for leading documents onto this discharging tray 37, and a pair of discharging rollers 36 disposed at the front end side of the pair of guides 35. The discharging roller 36 is rotated at the same speed as the conveying roller 22 according to the rotation of a pulse motor 25 which is commonly used for the roller 22. Around the discharging roller 36, a discharging sensor S5 is disposed to detect completion of each document discharging.

The document reversing means 10 is comprised of a lead-in guide 27 for leading documents into a switch-back path 29 branched from the discharging path 32 and a pair of reversing rollers 28 disposed in the vicinity of the lead-in guide 27. The reversing rollers 28 are opened and closed by a DC solenoid 33. They can be rotated forward/backward by the DC motor 18, and after the conveying direction of the document is switched from the front end side to the rear end side by switching rotation of the reversing roller 28 from forward to backward, the feeding of the document is started. A reversing sensor S4 is disposed in the vicinity of the reversing rollers 28.

Around the inlet of the above-mentioned document reversing means 10 and the inlet of the document discharging means 9, flappers 38 and 39 for switching the conveying direction of documents are disposed, respectively. These flappers 38 and 39 can be switched over by a DC solenoid 40. The first flapper 38 is used to switch the conveying direction of documents conveyed from the image reading position 5a to the document reversing means 10. The second flapper 39 is used to switch the conveying direction of documents between the document discharging means 9 and the conveying path leading to the image reading position 5a.

Furthermore, a document refuge path 41 which is branched from the conveying path 6 at the downstream side is formed between the resist roller 7 and the pinch roller 23 pressed against the conveying roller 22. This document refuge path 41 is comprised of a flapper 42 whose front end projects into the conveying path 6 by being urged upward by a spring and a guide plate 43 forming a curved refuge path between the same and the bottom surface of the flapper 42. The flapper 42 is pressed downward to disappear from the conveying path 6 when a document is conveyed thereon, while the tip of the flapper 42 projects into the conveying path 6 when no document exist on the flapper 42, thereby the refuge path is opened.

Figure 3:
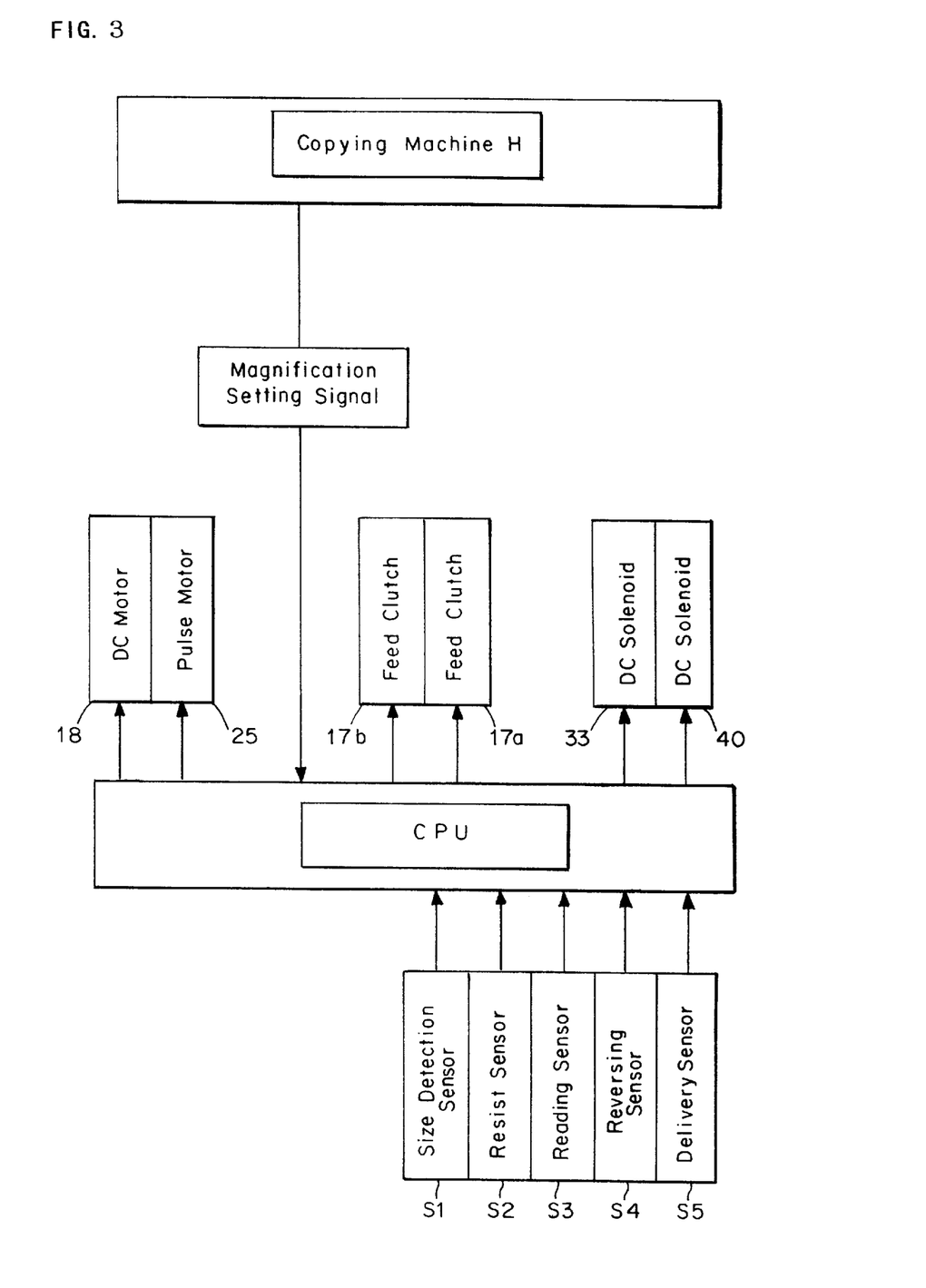
FIG. 3 is a block diagram of the control means.

FIG. 3 shows the control means of the automatic document feeder described above. The setting signal of a reading magnification from the copying machine H is inputted into the central processing unit (CPU) provided at the automatic document feeder. Based upon the setting signal, the rotation speed of the pulse motor 25 is set to control the conveying speed of a document. In addition, the above-mentioned CPU judges whether or not the conveying speed of the above-mentioned document is set within a predetermined range. If the conveying speed is judged to be within the range, the CPU controls the rotation of the,pulse motor 25 so that the speed of documents to be discharged onto the discharging tray 37 becomes equal to the discharging speed in the above-mentioned document reading. If the conveying speed in the above-mentioned document reading is judged to be out of range, the CPU controls the rotation of the pulse motor 25 so that the discharging speed after reading the document becomes a speed within a predetermined range.

The above predetermined range is determined based on the quality of the alignment of documents discharged onto the discharging tray 37. If discharged documents are stored in such condition that they are properly aligned without flying out or scattering around the discharging tray 37, it is judged to have satisfied a predetermined range. For example, if a copying machine H has a capacity of vertical magnification of 50 to 400%, the reading speed is set to 210 mm/sec, which is the satisfactory value for alignment of documents in a case where the most frequent magnification is 100%. Furthermore, when the magnification is about 70%, the reading speed is set to 300 mm/sec. When the magnification is 210%, the reading speed is set to 100 mm/sec. If documents are properly aligned on the discharging tray 37 within this range of 100 to 300 mm/sec, this range is decided as a predetermined range.

The above-mentioned CPU receives and transmits signals other than the setting signals of scaling rates for reading from and to the copying machine H, as well as controls the turn on/off and opening/closing of the motors 18 and 25, clutches 17a and 17b, and solenoids 33 and 44 according to the detection signals from the sensors S1, S2, S3, S4, and S5 as shown in FIG. 3.

Figure 4:
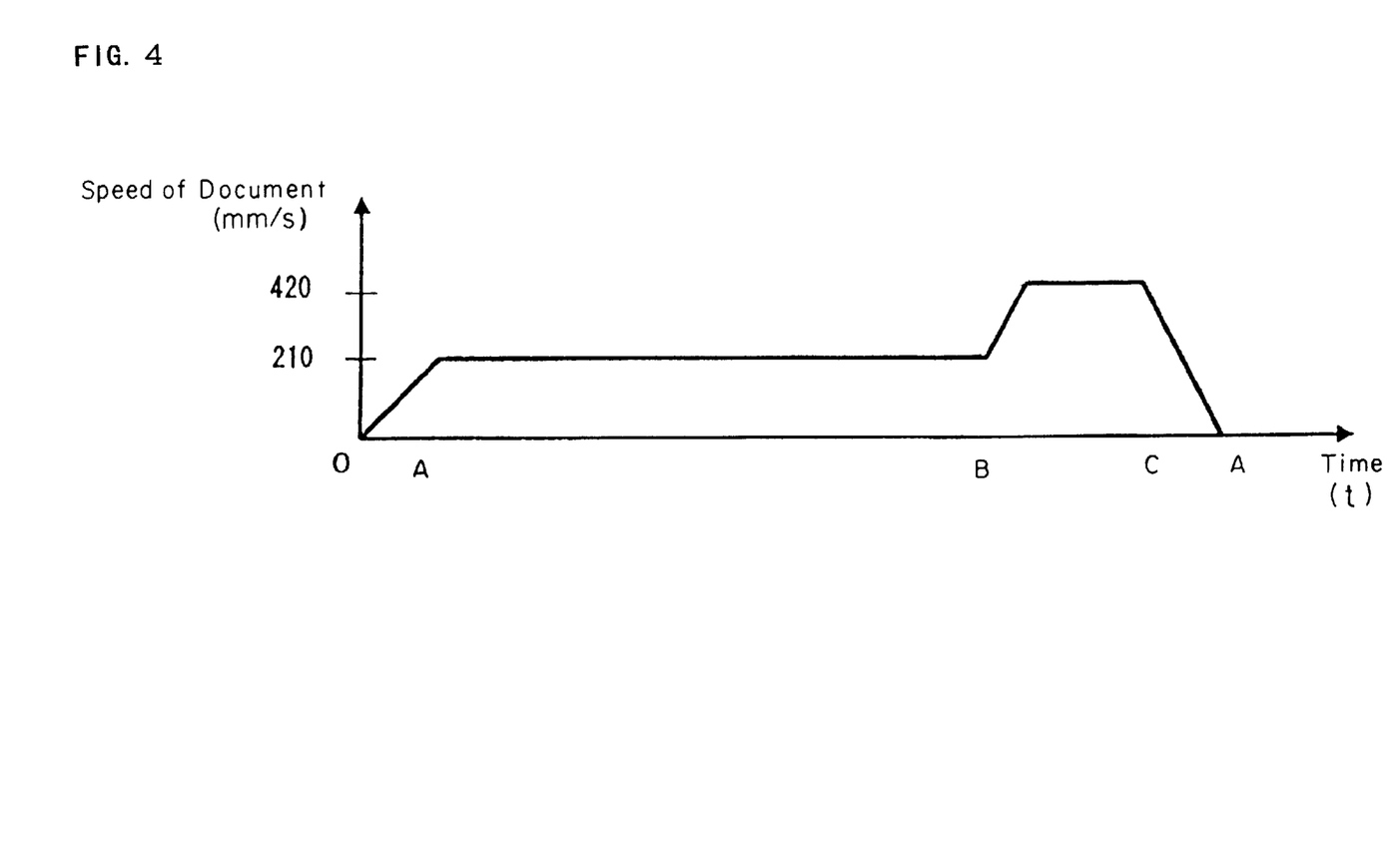
FIG. 4 is a graph showing the relationship between the document conveying speed and the conveying time when the reading speed is within a predetermined range.
Figure 5A:
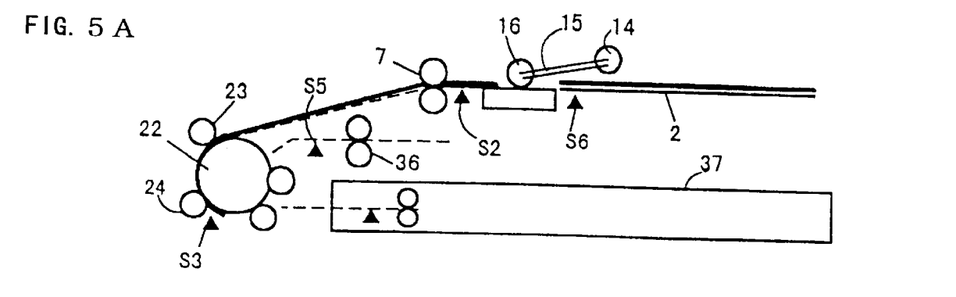
FIG. 5A through FIG. 5C are explanatory views schematically showing document conveyance in FIG. 4.
Figure 5B:
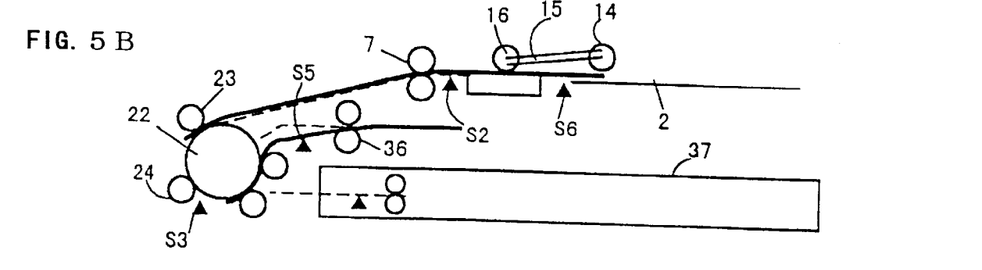
Figure 5C:
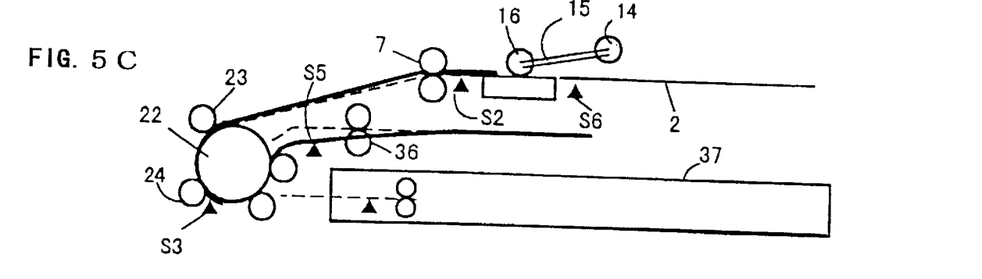

Next, the above-mentioned controlling method will be described with reference to FIGS. 4 through 7. FIGS. 4 and 5 show an example wherein the conveying speed in the document reading is set within a predetermined range. In this case, when a document is set on the feed tray 2, the empty sensor S6 is turned on and detects the existence of the document. The size of the document is then detected immediately from the size of the document in the conveying direction detected by the size detecting sensor S1 and the size of the document in the width direction detected from a variance of the variable volume. After this, the document size signals are transmitted to the copying machine H. When the START button on the copying machine H is pressed on, the feed clutches 17a and 17b are actuated to rotate the DC motor 18 forward. This forward rotation of the DC motor 18 makes the arm 15 of the feed roller 14 rotate as well as the separation roller 16 and the feed roller 14, thereby the extreme upper document placed on the feed tray 2 is separated and fed out.

By the document feeding, the resist sensor S2 detects the front end of the document and the DC motor 18 is stopped after a predetermined time from the detection by the resist sensor S2, thereby feeding of the document is stopped. At the same time, the front end of the document comes in contact with the resist roller 7, and the document is thus applied with resist. After a predetermined time from when the DC motor 18 stops, the feed clutch 17b is turned on, thereby the resist roller 7 starts nipping and conveying the document and the pulse motor 25 begins rotating. Furthermore, the document that passes from the resist roller 7 is conveyed by the conveying roller 22 and the pinch rollers 23 and 24. The rotation speed of the pulse motor 25 at this time is set based on the magnification setting signal sent from the copying machine H to the CPU, so that the document is conveyed within the range of 100 to 300 mm/sec.

If the front end of the document is detected by the read sensor S3, the pulse motor 25 and feed clutch 17b stop after a predetermined time. Conveyance of the document is thus stopped and the CPU enters the stand-by condition for reading (condition A). After this, the pulse motor 25 begins rotating again according to the read start signal from the copying machine H, driving the conveying roller 22 and feeding the document into the document reader 5b. Reading of images on the surface of the document are then started. The document conveying speed at this time is within the range of 100 to 300 mm/sec.

While the preceding document is read, the feed clutches 17a and 17b are turned on again, and the DC motor 18 begins rotating forward. Similar to the preceding document, the arm 15 of the feed roller 14 is rotated, thereby separation roller 16 and feed roller 14 are rotated to feed the extreme upper document (following document) set on the feed tray 2. The document is then applied with resist by the resist roller 7. When the rear end of the preceding document has passed the image reading position 5b, the front end of the following document is nipped by the pinch roller 23 (condition B).

Subsequently, the pulse motor 25 is switched to a high-speed operation so as to rotate the conveying roller 22 and discharging roller 36 at a high speed. The preceding document, which is already read, is conveyed at a high speed (420 mm/sec) in the discharging path 32 and the front end portion reaches above the discharging tray 37. The following document is also conveyed at the same speed. When the front end is detected by the reading sensor S3, the following document stands by at the position (condition C). The pulse motor 25 is then driven again according to the read start signal from the copying machine H, and by rotation of the conveying roller 22, the reading of the following document is started. Simultaneously, the preceding document is discharged onto the discharging tray 37 at the reading speed by the discharging roller 36, which rotates together with the conveying roller 22 at the same speed. The preceding document can thus be stored on the discharging tray 37 without flying out of the tray 37 or scattered on the discharging tray 37. Since the preceding and following documents are conveyed at the same speed as described above, there is almost no loss of time for conveying generated between documents such as waiting time for conveying, etc. The total processing time can thus be reduced.

Figure 6:
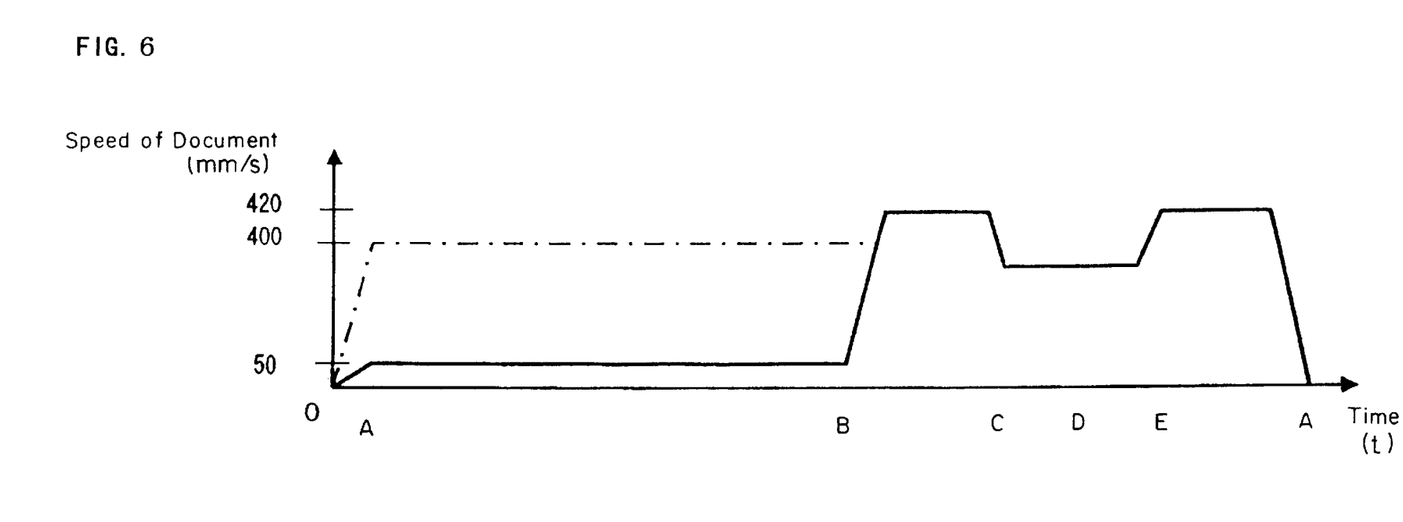
FIG. 6 is a graph showing the relationship between the document conveying speed and the conveying time when the reading speed is out of a predetermined range.
Figure 7A:
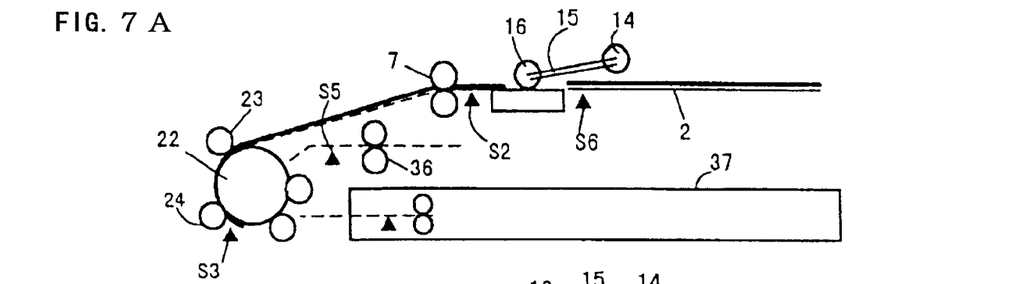
FIG. 7A through FIG. 7E are explanatory views schematically showing document conveyance in FIG. 6.
Figure 7B:
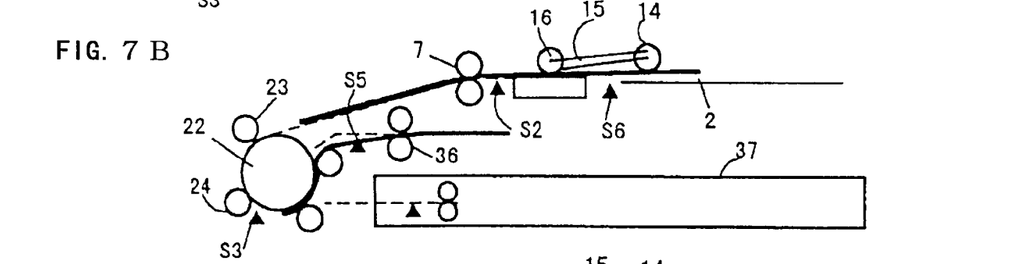
Figure 7C:
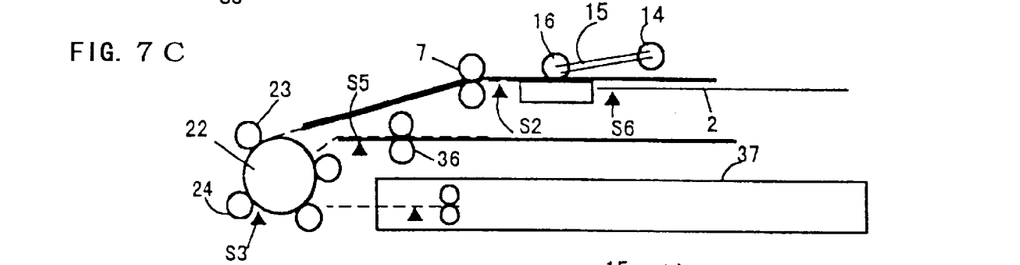
Figure 7D:
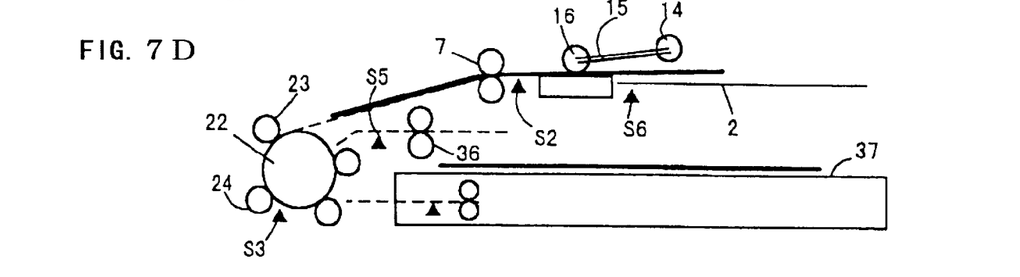
Figure 7E:
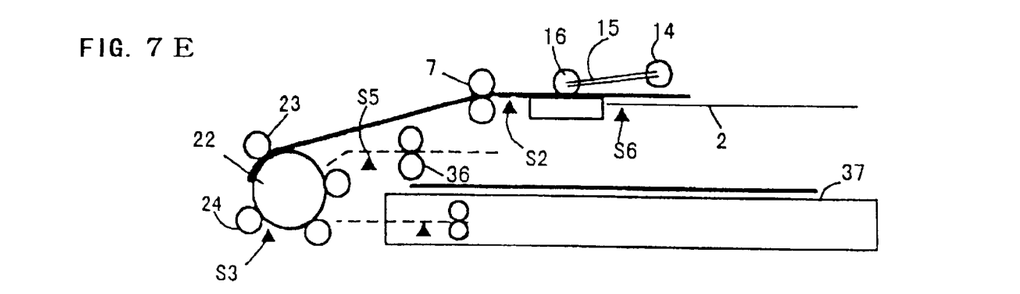
Figure 8A:
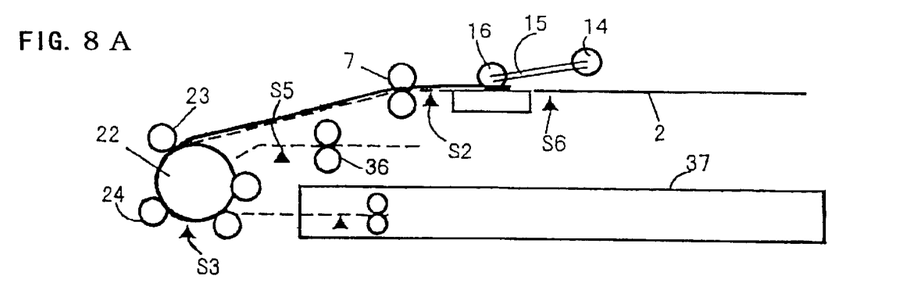
FIG. 8A through FIG. 8D are explanatory views schematically showing document conveyance.
Figure 8B:
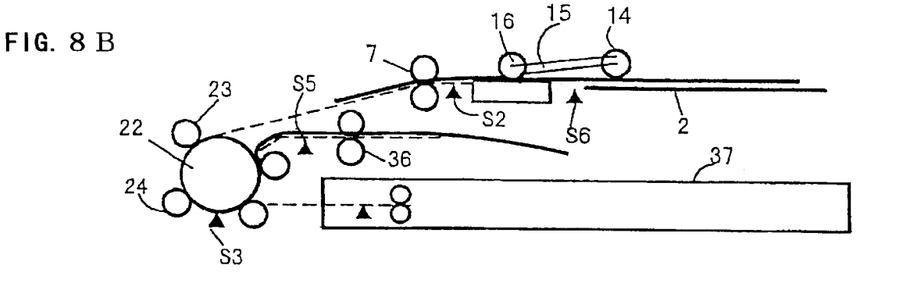
Figure 8C:
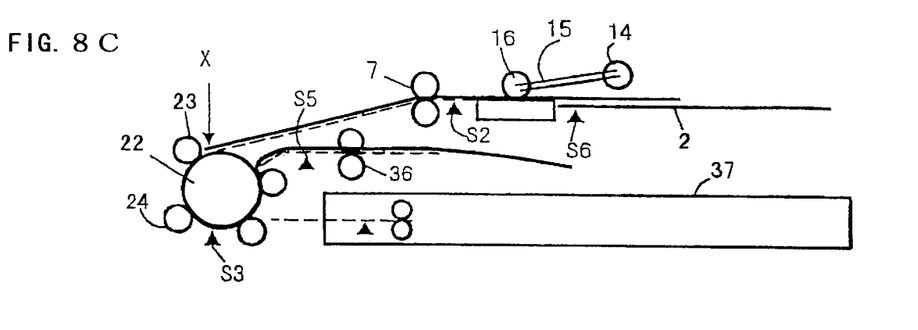
Figure 8D:
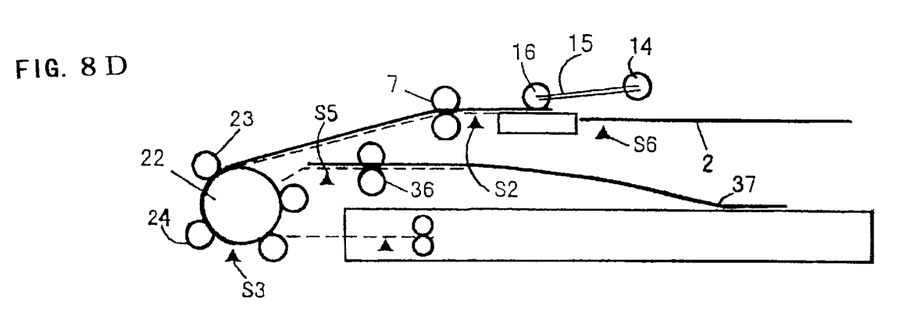

FIGS. 6 and 7 show control of conveying documents when the conveying speed in the document reading is out of the above-mentioned predetermined range. In this case, it is also similar to the above-mentioned embodiment, a document fed from the feed tray 2 is conveyed at a high speed by the conveying roller 22 after its front end is applied with resist by the resist roller 7, and the document then stands by for reading a position where its front end is detected by the reading sensor S3 (condition A). After this, the document is read at a reading speed which is set in advance according to the magnification of document (condition B). In this case, if the magnification is more than 210%, the document is read at a low speed of 100 mm/sec or less. If the magnification is less than 75%, the document is read at a high speed of 300 mm/sec or more. When the rear end of the document has passed the reading sensor S3, the pulse motor 25 is switched to a high-speed rotation after a predetermined time, the conveying roller 22 and discharging roller 36 are rotated at a high speed as described above, thereby the document is discharged at a high speed (420 mm/sec) until the rear end of the document is nipped by the discharging roller 36 (condition C) During this time, the following document is fed from the feed tray 2 and applied with resist by the resist roller 7, and the front end portion stands by at a position just before the pinch roller 23.

In a condition where the rear end of the document is nipped by the discharging roller 36, the rotation speed of the pulse motor 25 is reduced and switched to a discharging speed within a predetermined range. The predetermined discharging speed is a speed at which the document neither flies out of the discharging tray 37 nor scatters on the tray, and in detail, the discharging speed is between 100 and 300 mm/sec. In the present embodiment, the discharging speed is lowered from 420 mm/sec to 300 mm/sec, and then the document is discharged onto the discharging tray 37 by the discharging roller 36 (condition D). Therefore, the alignment of documents on the discharging tray 37 becomes satisfactory. During this condition, the following document is not discharged but left at the above-mentioned position (condition D). After the discharging of the preceding document is completed, the following document is fed along the conveying path 6 by the resist roller 7, nipped between the conveying roller 22 and pinch roller 23 (condition E), then conveyed to the position where the front end of the document is detected by the reading sensor S3 by rotating the conveying roller 22 at a high speed again, and returned to condition A.

Thus, in a case where the conveying speed when reading a document is out of the predetermined range, since the discharging speed when discharging the document onto the discharging tray 37 is switched, and the alignment is made proper, the document neither flies out nor scatters on the discharging tray 37 even when the reading speed is high, and when reading the document, even if the conveying speed is low, the rear end of the document never remains near the discharging tray 37. Also, in the above-mentioned embodiment, it is assumed that the conveying speed when discharging the documents is 300 mm/sec, however, it can be selected between 100 and 300 mm/sec in which the alignment of documents are maintained satisfactorily.

Furthermore, in each embodiment mentioned above, by detecting the front end of the document by the reading sensor S3, the document is stopped before the image reading position 5b, thereafter, conveyed at the reading speed again, however, the feed processing time can be shortened by changing the conveying speed of the document from high to the reading speed based on the detection of the document front end of the reading sensor S3 without stopping the document before the reading position.

FIG. 8 show a control means in a case where the following document does not reach the top-feed position of the feed path when the preceding document reaches the predetermined position of the discharging path. In a control means in which the conveying speed in reading a document is within the predetermined range, if the conveying speed of the conveying roller 22 is set to be faster than the feed speed before the pinch roller 23, or if document separating operation takes time and the front end of the following document does not reach the nipping point of the pinch roller 23 even when the rear and of the preceding document passes the reading position, the timing of the discharging operation of the preceding document and reading operation of the following document may not match.

In this case, the preceding document is stopped once at the predetermined position of the discharging path 32, and the following document is controlled so as to stand by until the following document reaches the position before the pinch roller 23. Describing this controlling operation with reference to FIG. 8, the document fed from the feed tray 2 is conveyed by conveying roller 22 after its front end is applied with resist by the resist roller 7, and stands by for reading at a point when the front end of the document is detected by the reading sensor S3 (condition A). Next, the document is read at a reading speed which is set in advance in accordance with the document magnification, and during this condition, the following document is fed from the feed tray 2. Furthermore, when the rear end of the preceding document has passed the image reading position 5b, the conveying condition of the following document is detected by the control means, and if the front end of the following document does not reach the nipping point of the pinch roller 23, the pulse motor 25 is stopped and the preceding document is made to stand by at a predetermined position of the discharging path 32 (condition B). At this point, the conveying condition of the following document can be recognized by detecting the front end of the following document by the resist sensor S2 and by counting the pulse signal generated from an encoder (not illustrated) synchronizing with the rotation of the DC motor 18. In a condition where the preceding document is made to stand by, the feed operation is continued, and if the front end of the document reaches the position X before the pinch roller 23, the pulse motor 25 is driven again (condition C), and the conveying roller 22 and the discharging roller 36 are rotated at the conveying speed. The preceding document after being read is conveyed along the discharging path 32 and the front end thereof reaches above the discharging tray 37. The following document is also conveyed at the same conveying speed, and after the front end thereof is detected by the reading sensor S3, the document stands by at the position (condition D). Thereafter, the pulsemotor 25 is driven again, and the conveying roller 22 is rotated to convey the following document at the reading speed. Then, at the same time as the reading of the following document is started, the preceding document is discharged on the discharging tray 37 at the reading speed by the discharging roller 36 which rotates at the same speed as that of the conveying roller 22. By employing such a controlling means, the discharging operation of the preceding document and the conveying operation of the following document at the image reading position match each other, so that there is no possibility that the preceding document is discharged at the conveying speed out of the predetermined range.

According to the invention, feed controlling is possible even in a case where various sized documents are mixed and placed on the feed tray, or in a case where the magnification mode differs for each document, and in this case, always based on the information of the reading speed of the following document, the discharging speed of the preceding document is controlled. Furthermore, in the abovementioned embodiment, the conveying speed when reading a document is determined depending on the magnification mode of the document, however, needless to say, the conveying speed is not set dependent only on the magnification mode.

What is claimed is:

1. An automatic document feeder comprising:

a feed tray on which documents are placed;

a feeder which feeds the documents on the feed tray one by one to a conveying path;

a conveyor which conveys the documents fed to the conveying path to an image reading position, and which conveys the documents further via the reading position;

a discharge tray on which the documents conveyed via the image reading position are discharged;

a discharging section for discharging the documents conveyed via the image reading position to the discharge tray; and control means for controlling a conveying speed of the documents conveyed by the conveyor and discharged by the discharging section, wherein the control means controls the conveyor and the discharging section so that when a following document fed next after a preceding document fed by the feeder is conveyed on the image reading position at a conveying speed within a predetermined range by the conveyor, the preceding document conveyed via the image reading position is discharged on the discharge tray at the conveying speed within the predetermined range by the discharging section when the following document is conveyed on the image reading position at the conveying speed within the predetermined range, after the following document is conveyed to an upstream side of the image reading position at a speed which is higher than the conveying speed within the predetermined range by the conveyor, and when the following document is conveyed on the image reading position at a conveying speed outside the predetermined range by the conveyor, the preceding document conveyed via the image reading position is discharged on the discharge tray at a conveying speed within the predetermined range by the discharging section, and after that, the following document is conveyed to the upstream side of the image reading position at a speed which is higher than the conveying speed within the predetermined range by the conveyor, and further after that, the following document is conveyed on the image reading position at the conveying speed outside the predetermined range by the conveyor.

2. The automatic document feeder as set forth in claim 1, wherein the conveyor and the discharging section are driven by a same driving means.

3. The automatic document feeder as set forth in claim 2, wherein the driving means simultaneously drives the conveyor and the discharging section at the same speed.

4. The automatic document feeder as set forth in claim 1, wherein the conveying speed at which the preceding document is discharged on the discharge tray is within a range in which the documents are substantially aligned on the discharge tray.

5. The automatic document feeder as set forth in claim 1, further comprising a document detector disposed in the vicinity of the document reading position, wherein when the following document is conveyed on the image reading position at a conveying speed within a predetermined range by the conveyor, the control means controls so that the preceding document is discharged by the discharging section on the discharge tray after the document detector detects the following document.

6. The automatic document feeder as set forth in claim 5, wherein the conveyor and the discharging section are driven by a same driving means.

7. The automatic document feeder as set forth in claim 6, wherein the driving means drives the conveyor and the discharging section at the same speed.

8. An automatic document feeder comprising:

a feed tray on which documents are placed;

a feeder which feeds the documents on the feed tray one by one to a conveying path;

a conveyor which conveys the documents fed to the conveying path to an image reading position, and for further conveying the documents via an image reading position;

a discharge tray on which the documents conveyed via the image reading position are discharged;

a discharging section for discharging the documents conveyed via the image reading position onto the discharge tray; and a control means for controlling a conveying speed of documents conveyed by the conveyor and discharged by the discharging section, wherein the control means controls the conveyor and the discharging section so that when a following document fed next to a preceding document fed by the feeder is conveyed on the image reading position at a conveying speed within a predetermined range by the by conveyor, until the following document fed by the feeder reaches the conveyor, the preceding document is not discharged and is stopped once at a position downstream of the image reading position, and when the following document reaches a predetermined position which is upstream of the image reading position, a discharging operation for discharging the preceding document on the discharge tray and a conveying operation for conveying the following document on the image reading position are simultaneously carried out.

9. The automatic document feeder as set forth in claim 8, wherein the conveyor and the discharging section are driven by a same driving means.

10. The automatic document feeder as set forth in claim 9, wherein the driving means simultaneously drives the conveyor and the discharging section at the same speed.

* * * * *

UNITED STATES PATENT AND TRADEMARK OFFICE
CERTIFICATE OF CORRECTION

PATENT NO. : 6,206,359 B1
DATED : March 27, 2001
INVENTOR(S) : Kazuhiro Hirota et al.

Page 1 of 1

It is certified that error appears in the above-identified patent and that said Letters Patent is hereby corrected as shown below:

Title page,
Item [56], References Cited, under "FOREIGN PATENT DOCUMENTS", delete "5-055157    3/1993    (JP). --.

Item [57], ABSTRACT,
Line 3, change "conveyor" to -- conveying --;
Line 3, change "conveying" to -- a conveyor --;
Line 6, change "by which" to -- for setting --.

Signed and Sealed this

Sixteenth Day of April, 2002

Attest:

Attesting Officer

JAMES E. ROGAN
Director of the United States Patent and Trademark Office